US008266706B2

(12) United States Patent  
Reid (10) Patent No.: US 8,266,706 B2
(45) Date of Patent: Sep. 11, 2012

(54) CRYPTOGRAPHICALLY CONTROLLING ACCESS TO DOCUMENTS

(75) Inventor: Colin Wilson Reid, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 987 days.

(21) Appl. No.: 11/698,369

(22) Filed: Jan. 26, 2007

(65) Prior Publication Data

US 2008/0184039 A1   Jul. 31, 2008

(51) Int. Cl.
*G06F 17/30* (2006.01)
(52) U.S. Cl. ............................................ 726/26; 726/30
(58) Field of Classification Search .............. 726/26–30; 707/9
See application file for complete search history.

(56) References Cited

U.S. PATENT DOCUMENTS

| 5,974,238 | A | 10/1999 | Chase, Jr. |
| 6,389,423 | B1 | 5/2002 | Sakakura |
| 6,505,200 | B1 | 1/2003 | Ims et al. |
| 6,732,277 | B1 | 5/2004 | Vandergeest et al. |
| 6,757,896 | B1 | 6/2004 | Cohen et al. |
| 6,901,386 | B1 * | 5/2005 | Dedrick et al. ................. 705/59 |
| 6,928,467 | B2 | 8/2005 | Peng |
| 6,983,296 | B1 * | 1/2006 | Muhlestein et al. ........... 707/206 |
| 7,134,020 | B2 | 11/2006 | Eagle et al. |
| 7,353,397 | B1 | 4/2008 | Herbach |
| 2003/0005306 | A1 | 1/2003 | Hunt et al. |
| 2003/0084280 | A1 | 5/2003 | Bryan et al. |
| 2003/0115481 | A1 * | 6/2003 | Baird et al. ..................... 713/201 |
| 2003/0120685 | A1 | 6/2003 | Duncombe et al. |
| 2004/0128513 | A1 | 7/2004 | Wu et al. |
| 2004/0168077 | A1 * | 8/2004 | Waxman et al. ............... 713/200 |
| 2004/0172423 | A1 | 9/2004 | Kaasten et al. |
| 2004/0175000 | A1 | 9/2004 | Caronni |
| 2005/0050363 | A1 | 3/2005 | Naka et al. |
| 2005/0055698 | A1 | 3/2005 | Sasaki et al. |
| 2005/0071658 | A1 * | 3/2005 | Nath et al. ..................... 713/193 |
| 2005/0137895 | A1 | 6/2005 | Whitlock et al. |
| 2005/0138211 | A1 | 6/2005 | Cheng |
| 2007/0038688 | A1 | 2/2007 | Morrill et al. |
| 2009/0019548 | A1 | 1/2009 | Reid |

FOREIGN PATENT DOCUMENTS

| CN | 101689989 A | 3/2010 |
| EP | 0132006 A2 | 1/1985 |
| EP | 1320016 A2 | 6/2003 |
| EP | 2176984 A2 | 4/2010 |
| JP | 2005-332010 A | 12/2005 |
| JP | 2010-534033 A | 10/2010 |

(Continued)

OTHER PUBLICATIONS

Requena, Jose, "An Implementation of the Server Cache Synchronisation Protocol (SCSP)", Date: Mar. 1999, , pp. 69, http://www.netlab.tkk.fi/tutkimus/ipana/paperit/josems.pdf.

(Continued)

*Primary Examiner* — Edward Zee (57) ABSTRACT

Aspects of the subject matter described herein relate to cryptographically controlling access to documents. In aspects, documents are encrypted to protect them from unauthorized access. A security principal seeking to access a document first obtains the document. The document includes an identifier that identifies security data associated with the document. The security data includes an encrypted portion that includes authorizations for security principals that have access to the document. A security principal having the appropriate key can decrypt its authorization in the security data to obtain one or more other keys that may be used to access the document. These other keys correspond to access rights that the security principal has with respect to the document.

23 Claims, 6 Drawing Sheets

FOREIGN PATENT DOCUMENTS

| KR | 10-2004-0070382 A | 8/2004 |
|---|---|---|
| RU | 2010100880 A | 7/2011 |
| WO | WO02082281 A2 | 10/2002 |
| WO | 20091012165 A2 | 1/2009 |
| WO | 20091012165 A3 | 4/2009 |

OTHER PUBLICATIONS

Scott et al., "Haggle: a Networking Architecture Designed Around Mobile Users", http://www.cambridge.intel-research.net/haggle/pubs/haggle-wons06-editforxtoff.pdf.

Young, David, "Expanding Network-Portable Access to Remote Computing Resources", Date: May 21, 2003, http://innovexpo.itee.uq.edu.au/2003/projects/s358304/thesis.pdf.

Written Opinion of the International Searching Authority for PCT Application No. PCT/US2008/051718, dated May 4, 2010, 4 pages.

International Preliminary Report on Patentability for International appl. No. PCT/US2008/051718 mailed on May 27, 2010, 4 pages.

European Search Report for European appl. No. 08825902.3 dated Jul. 12, 2011, 5 pages.

International Preliminary Report on Patentability received for PCT Application No. PCT/US2008/069842, issued on Jan. 19, 2010, 4 pages.

International Search Report and Written Opinion received for PCT Application. No. PCT/US2008/069842, mailed on Feb. 13, 2009, 10 pages.

Non Final Office Action received for U.S. Appl. No. 11/777,297, mailed on Aug. 20, 2010, 25 pages.

Final Office Action received for U.S. Appl. No. 11/777,297, mailed on Jan. 25, 2011, 14 pages.

\* cited by examiner

| Document Version Data Structure 400 ||
|---|---|
| Document Identifier | 405 |
| Security Data Identifier | 410 |
| Timestamp | 415 |
| Encrypted Data | 420 |
| Signature | 425 |

| Security Data Structure 427 ||
|---|---|
| Security Data Identifier | 430 |
| Authorization(s) | 435 |
| Key(s) | 440 |
| Signature | 445 |

CRYPTOGRAPHICALLY CONTROLLING ACCESS TO DOCUMENTS

BACKGROUND

Granting access to user data is typically performed programmatically. That is, an operating system or web service grants access to the data based on access rights of the user. This model is not very secure, particularly in web-hosted environments in which the user's data is stored on a server that is accessible by many other users or processes. If the security of the server is compromised, the user's data may be accessed without the user's permission or knowledge. The more entities that are involved in handling a user's data, the less secure the data is.

SUMMARY

Briefly, aspects of the subject matter described herein relate to cryptographically controlling access to documents. In aspects, documents are encrypted to protect them from unauthorized access. A security principal seeking to access a document first obtains the document. The document includes an identifier that identifies security data associated with the document. The security data includes an encrypted portion that includes authorizations for security principals that have access to the document. A security principal having the appropriate key can decrypt its authorization in the security data to obtain one or more other keys that may be used to access the document. These other keys correspond to access rights that the security principal has with respect to the document.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
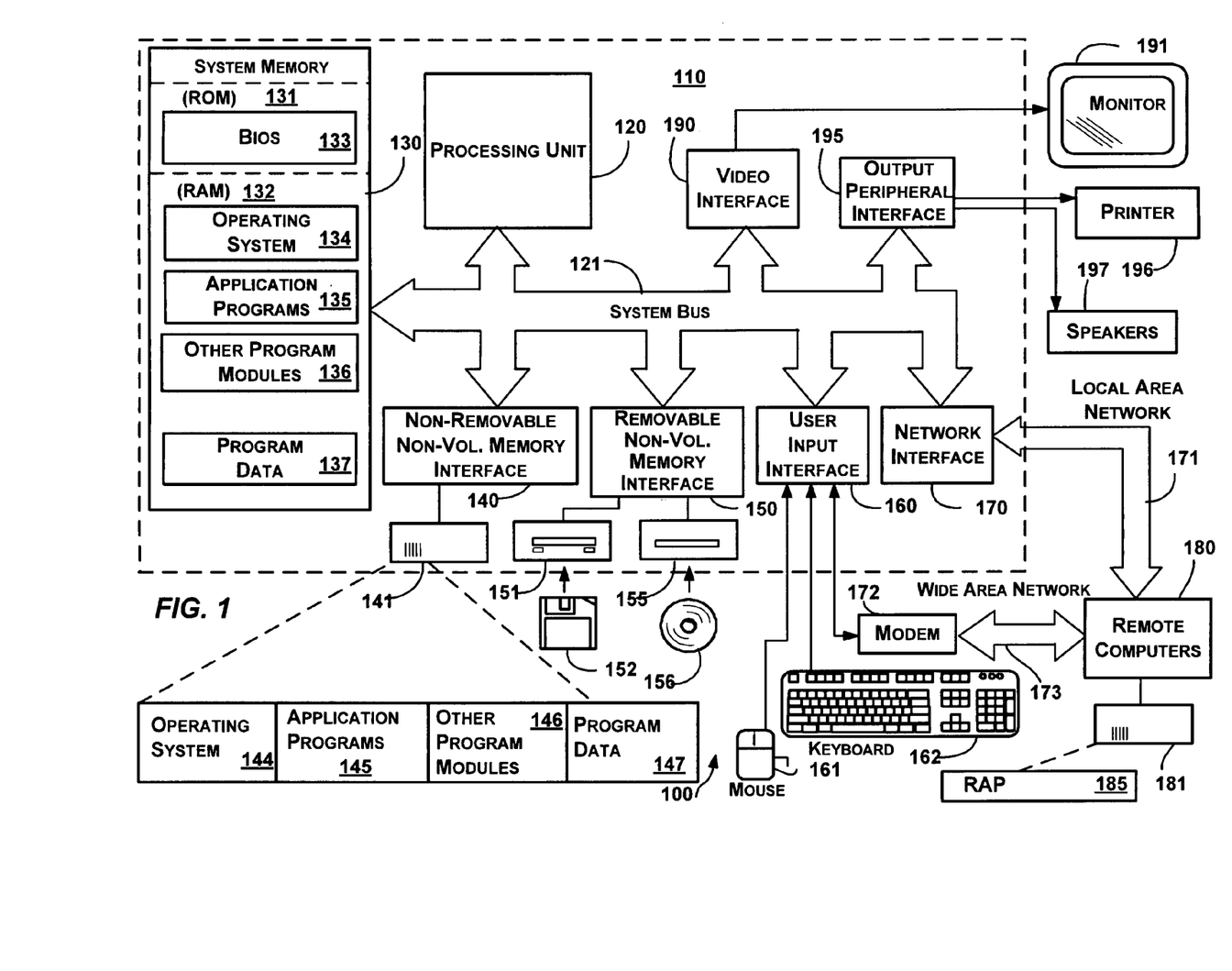
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Controlling Access to Documents

Figure 2:
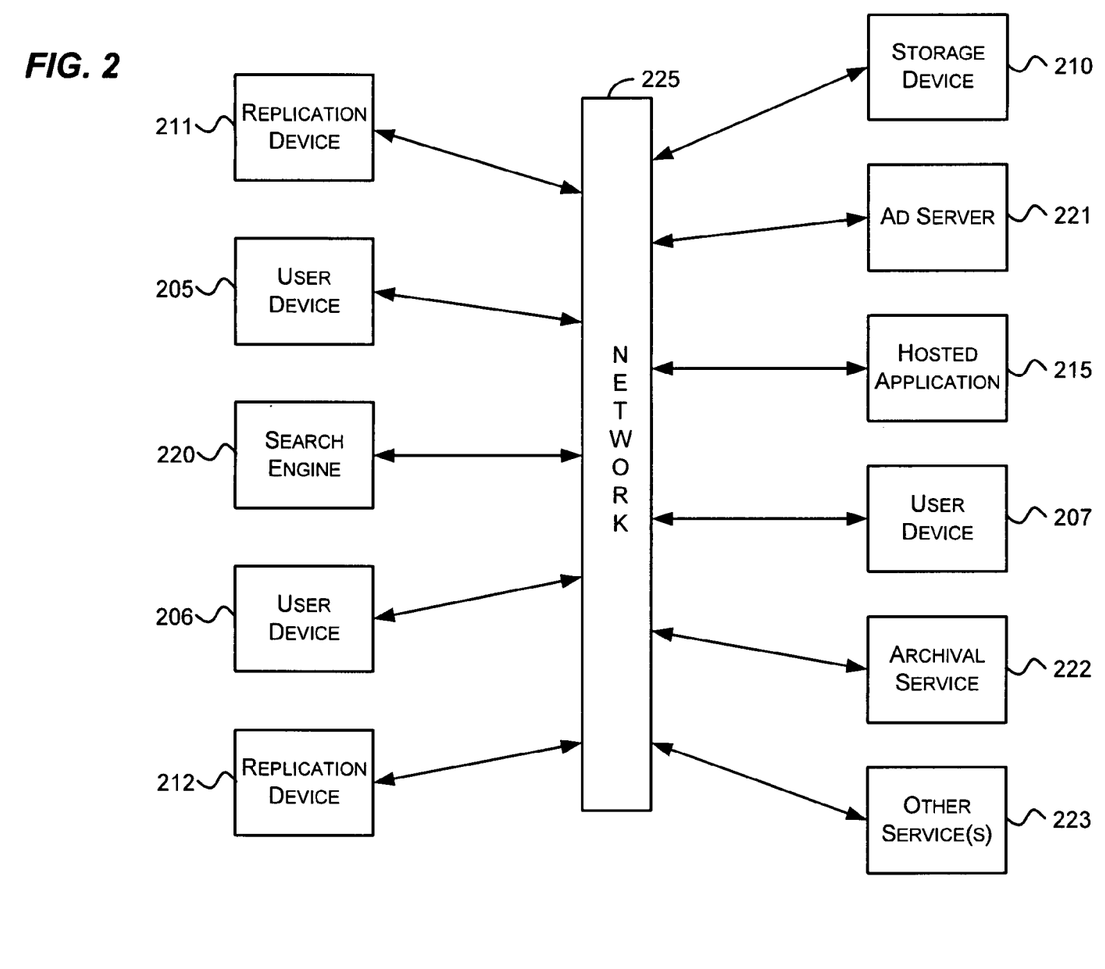
FIG. 2 is a block diagram that generally represents an exemplary environment in which aspects of the subject matter described herein may operate.

FIG. 2 is a block diagram that generally represents an exemplary environment in which aspects of the subject matter described herein may operate. The environment includes user devices 205-207, storage devices 210-212, a hosted application 215, services 220-223, and a network 225.

A user may use a user device 205 to store data on the storage device 210. The user data may then be accessed by the user devices 205-207, the services 220-223, and the hosted application 215. The user data may also be replicated on the replication devices 211-212.

The user devices 206 and 207 may be operated by the user who stored the data or may be operated by other users whom the user has given access rights to the data. For example, a user may have a computer (e.g., user device 205) at work with which the user stores the data on the storage device 210. At home, the user may have another computer (e.g., user device 206) with which the user accesses the data. A user may also have a cell phone or other electronic device (e.g., user device 207) with which the user accesses the data. When a user is traveling, the user may access the data via a computer the user takes with him or via another computer or electronic device the user is able to use.

As mentioned previously, the user may desire to have other users have access to the data and may grant the other users such access. These users may use computers or other electronic devices (e.g., user devices 206 and 207) to access the data according to their access rights.

The user may desire to access the data via a hosted application 215. The user may access the hosted application 215 via a web browser, for example, and may then access the data via the hosted application 215.

The user may desire to have certain services have access to the user's data. For example, the user may wish to have an ad server 221 access the user's data to provide relevant ads to the user or others. The user may desire to have a search engine 220 have access to the user's data to allow others to find the user's data. The user may desire to have an archival service 222 have access to the data to create archival backups of the data. The user may also desire to have other services 223 have access to the data for various purposes.

The user may desire each entity with access to the user data be given a certain set of access rights that may vary from entity to entity. For example, the user may desire an archival service to be able to copy the data but not to be able to read the data in a meaningful way or to modify the data. Being able to copy the data without reading it in a meaningful way or modifying it is sometimes referred to as "copy-only" access. As another example, the user may desire to have the ad server 221 and the search engine 220 be able to read the data but not be able to write to the data. The user may desire to have some colleagues have read/write access to the data while other business associates have read access or copy-only access to the data.

The network 225 represents any mechanism and/or set of one or more devices for conveying data from one entity to another and may include intra- and inter-networks, the Internet, phone lines, cellular networks, networking equipment, and the like. The user may desire to have devices of the network 225 be able to copy the data to transmit it to other entities but not to be able to change the data or read it in a meaningful way.

Examples of the devices (e.g., devices 205-207 and 210-212) include cell phones, text messaging devices, smart phones, networking devices, the special and general purpose electronic devices (or portions thereof) as described in conjunction with FIG. 1, combinations or variations of the above, and the like.

As will be recognized by those of skill in the art, having many entities handling or having access to the data makes it more difficult to keep the data secure and to ensure that access is controlled as desired. Aspects of the subject matter described herein address controlling the access as described below.

Figure 3:
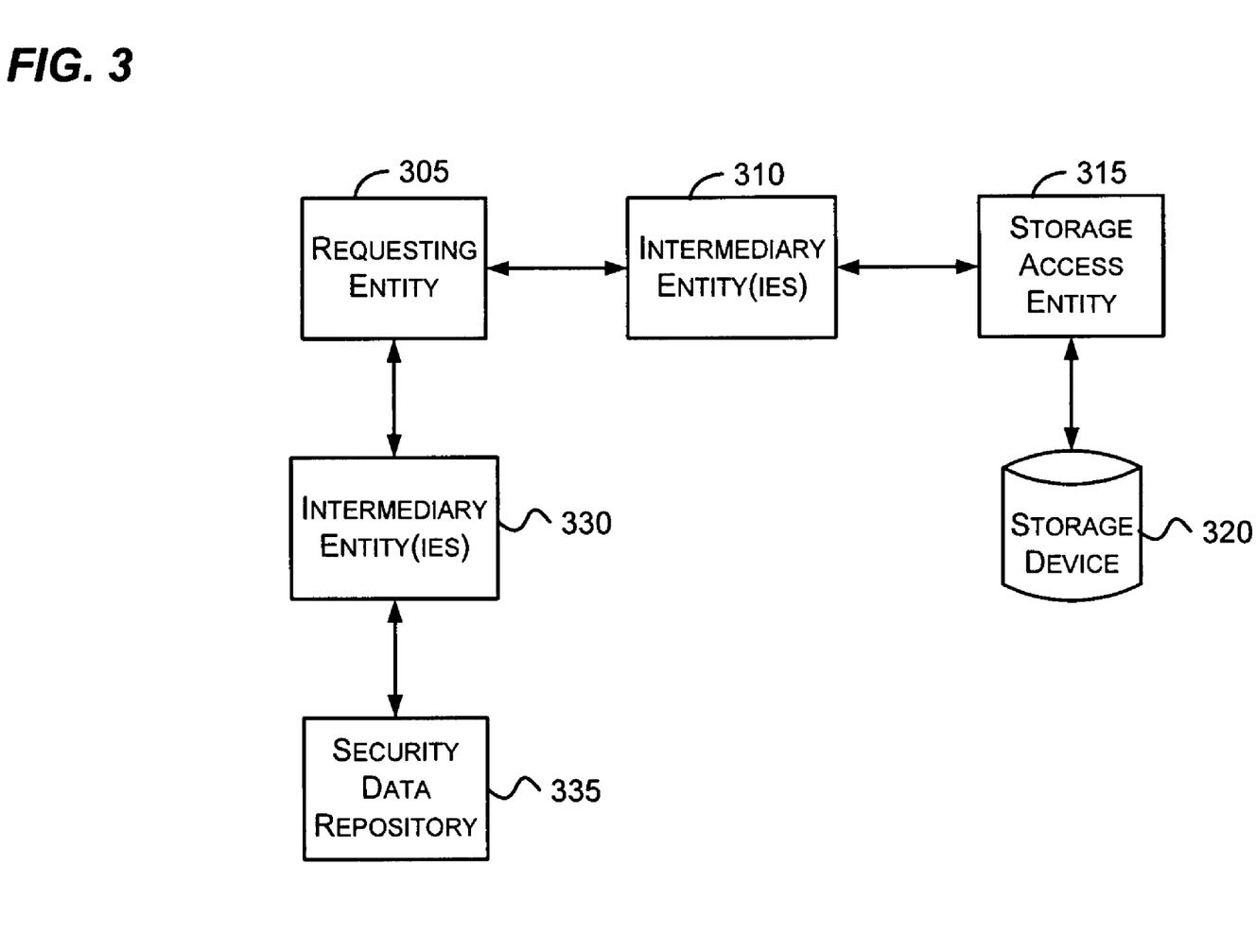
FIG. 3 is a block diagram that generally represents an exemplary set of entities that may participate in providing access to a document according to aspects of the subject matter described herein.

FIG. 3 is a block diagram that generally represents an exemplary set of entities that may participate in providing access to a document according to aspects of the subject matter described herein. The entities include the requesting entity 305, zero or more intermediary entities 310 and 330, a storage access entity 315, a storage device 320, and a security data repository 335.

In one embodiment, the requesting entity is an electronic device such as a computer and the intermediary entities 310 and 330 are zero or more networking devices, servers, or other devices that are between the requesting entity and the storage access entity 315 and/or the security data repository 335. The storage access entity 315 is the device that is capable of accessing the storage device (e.g., the storage device 320) upon which a requested document is stored.

Document as used herein includes any set of bits of any length that are capable of being stored on a storage device. As will be discussed in further detail in conjunction with FIG. 4, a version of a document may include a document identifier, a security data identifier, and encrypted data among other data. The document identifier uniquely identifies the document in a particular namespace. The security data identifier may be used to retrieve security data pertaining to the document. The encrypted data may include, for example, content that a user wishes to secure such as a word processing file, a spreadsheet, other data, cryptographic keys that may be used to decrypt other data, or any other data important to a user.

Because the data is encrypted, it can only be meaningfully read by someone who has a key for decrypting the data. As will be discussed in further detail below, these keys are kept in security data in a security data repository. With the appropriate key, a user can decrypt the encrypted data and access the content therein.

The storage device 320 is any computer-readable medium capable of storing data and may include distributed file systems, for example. Some exemplary computer-readable media that are suitable for the storage device 320 have been described above in conjunction with FIG. 1.

The security data repository 335 stores security data pertaining to the documents stored on the storage device 320. The security data repository 335 may include one device or several devices that work in concert with each other. The security data repository 335 may include a security data record for each version of a document. The requesting entity 305 may request a security data record corresponding to a retrieved document by sending a security data identifier included in the document to the security data repository and requesting the security data identified thereby.

In one embodiment, the security data may be stored in the document itself. In this embodiment, the requesting entity may obtain the security data directly from the document.

In one embodiment, one or more of the entities 305, 310, 315, and 330 may be one or more processes or components that execute on one or more devices. In one embodiment, the storage device 320 and/or the security data repository 335 may be devices included in or attached to the device upon which the requesting entity 305 executes. Documents stored in the storage device 320 may be placed there by a user of the device upon which the requesting entity 305 executes, from another device, or may be placed there by a file replicating infrastructure, for example.

As can been seen, in an exemplary operating environment described above in conjunction with FIG. 3, a document may pass through many entities in route to and from the entities that seek to access to the document. Encrypting the data of the document and indicating what security data is needed to decrypt the data allows the data to be securely stored on any storage device and in any configuration of devices.

Figure 4:
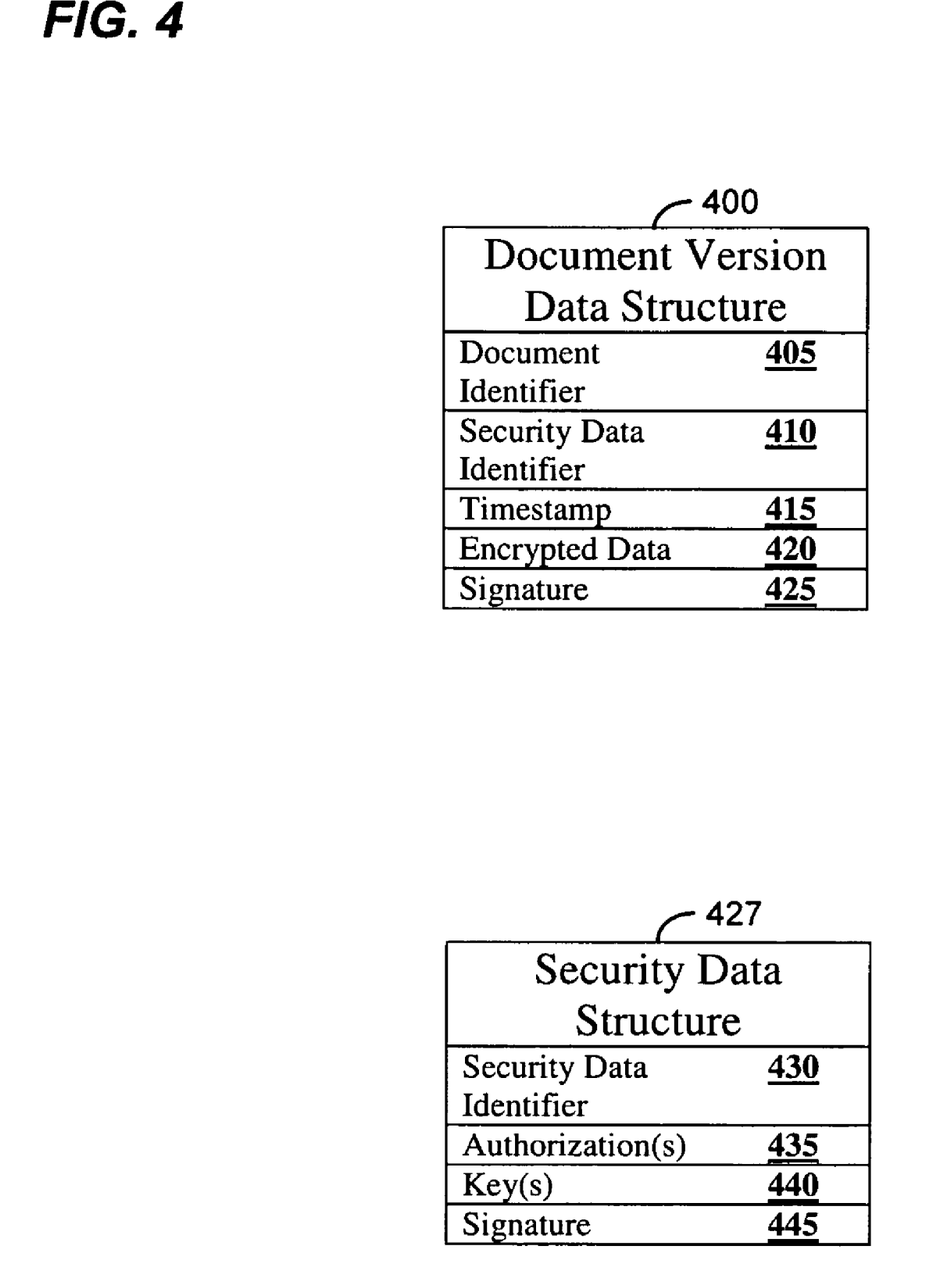
FIG. 4 illustrates some exemplary data structures that may be used in conjunction with aspects of the subject matter described herein.

FIG. 4 illustrates some exemplary data structures that may be used in conjunction with aspects of the subject matter described herein. A document version data structure (e.g., document version data structure 400) may be stored for each version of a document. Each document version data structure 400 may include various fields including a document identifier 405, a security data identifier 410, a timestamp 415, encrypted data 420, and a signature 425.

The document identifier 405 may be used to uniquely identify a document in a given namespace. For example, a uniform resource identifier (URI) having a http-like syntax (e.g., live://alice/users/file1.txt) may be used to identify documents in a given namespace.

The security data identifier 410 may be used to identify security data associated with the document. In one embodiment, the security data identifier 410 is a hash of the fields (other than itself) in a security data structure (e.g., the security data structure 427). A hash takes an input data and calculates a fixed length output data. Given a sufficiently large fixed length output data and a suitable hash, the hash effectively provides a unique identifier for the input stream.

The timestamp field 410 may include a timestamp that indicates when the version was created. As discussed previously, the encrypted data field 420 may include any content that the user wishes to secure.

The signature field 425 comprises any one or more mechanisms that may be used to ensure that the document version data structure 400 was created by an authorized user and has not changed since creation.

The document version data structure 400 may include more or fewer fields as long as is includes a mechanism for identifying or including security data pertaining to the document and a mechanism for encrypting desired data.

The security data structure 427 may include a security data identifier field 430, one or more authorization fields 435, one or more keys 440, and a signature 425. In one embodiment, the security data identifier in the security data identifier field 430 may be calculated as described previously (i.e., as a hash of the other fields of the security data structure 427).

The authorization fields 435 include an authorization for each security principal that is to have access to the document version data structure 400. In some embodiments, a security principal is an entity that can be positively identified and verified via a technique known as authentication. In other embodiments, a security principal may comprise a key decrypted from the security data associated with another document. A security principal may include a user, machine, service, process, other entity, decrypted key, or multiple (e.g., groups) of one or more of the above. Each authorization may be encrypted by a key that may be decrypted by a key held by or created by the security principal. Public key/private key cryptography is one mechanism that may be used to encrypt/decrypt an authorization.

As a particular security principal may have many keys and there may be many authorizations in a security document, in one embodiment, an optimization provides a key hint that provides the first few bits (in plain text) of a key that may be used to decrypt the authorization. The key hint allows an entity to quickly determine which authorizations it should attempt to decrypt as the entity can simply compare the first few bits with its key. When there are hundreds or thousands of authorizations, the time savings provided by this mechanism may be substantial. Because only a few bits (e.g., between 2 and 16) may be provided, the strength of the mechanism used to encrypt/decrypt the authorizations may not be significantly weakened. If needed, the strength of the mechanism may be increased by using longer keys.

In one embodiment, an authorization includes encrypted keys that allow a security principal to perform one or more access rights with respect to a document version. For example, a user principal may be given the rights to read the document, create new versions of the document, change which security principals may access the document, and perform any other security-related actions with respect to the document. Another user principal may be given read-only or write-only access. Entities that are not given any rights with respect to a document may still have copy-only access (i.e., the ability to copy but not meaningfully read the encrypted data). Such entities may be used, for example, for archiving documents.

In another embodiment, the authorization may include an encrypted key that allows the security principle to decrypt additional keys elsewhere (e.g., in key(s) 440) of the security data structure 427. These additional keys may grant access rights to the document to the security principal. This may be done, for example, to reduce the space needed for the security data structure 427 as a single key in an authorization may be used to decrypt multiple keys elsewhere in the security data structure 427. When a security data structure 427 includes hundreds or thousands of authorizations, many authorizations may share a common set of access rights. While the keys corresponding to these access rights could be included in the authorization itself, it may be more space efficient to provide a single key in each authorization that allows the security principals to decrypt the access keys elsewhere in the security data structure 427.

The keys 440 may include encrypted private keys as discussed previously that may correspond to access rights granted in the document. These keys may be decrypted by keys obtained in the authorization(s) field 435 as discussed previously.

The signature field 445 may be used in a similar fashion as the signature field 425 of the data structure 400.

The security data structure 427 may include more or fewer fields as long as it includes a mechanism for providing keys to access its associated document(s) to authorized users.

The document version data structure 400 may include an identifier that identifies another document version data structure. The other document version data structure may include a key that allows access to the document. This mechanism may be used to provide group access to a document. For example, the authorizations in the security data structure associated with the first document version data structure may correspond to keys held by members of a group. Any member of the group who has an appropriate key may be able to obtain a member key from the security data that allows the member to access the second document according to rights granted to the group in the security data associated with the second document. Thus, accessing a document may involve accessing an intermediate document.

In another embodiment, the document version data structure 400 may omit the identifier. In this embodiment, another mechanism may suggest that the keys in the first document's security data may provide access to the second document. For example, if the first document was known to provide group access to another document, the member key from the first document's security data may be tried on every authorization in the security data for every other document the user attempts to access. Key hints as described previously may speed this process.

Figure 5:
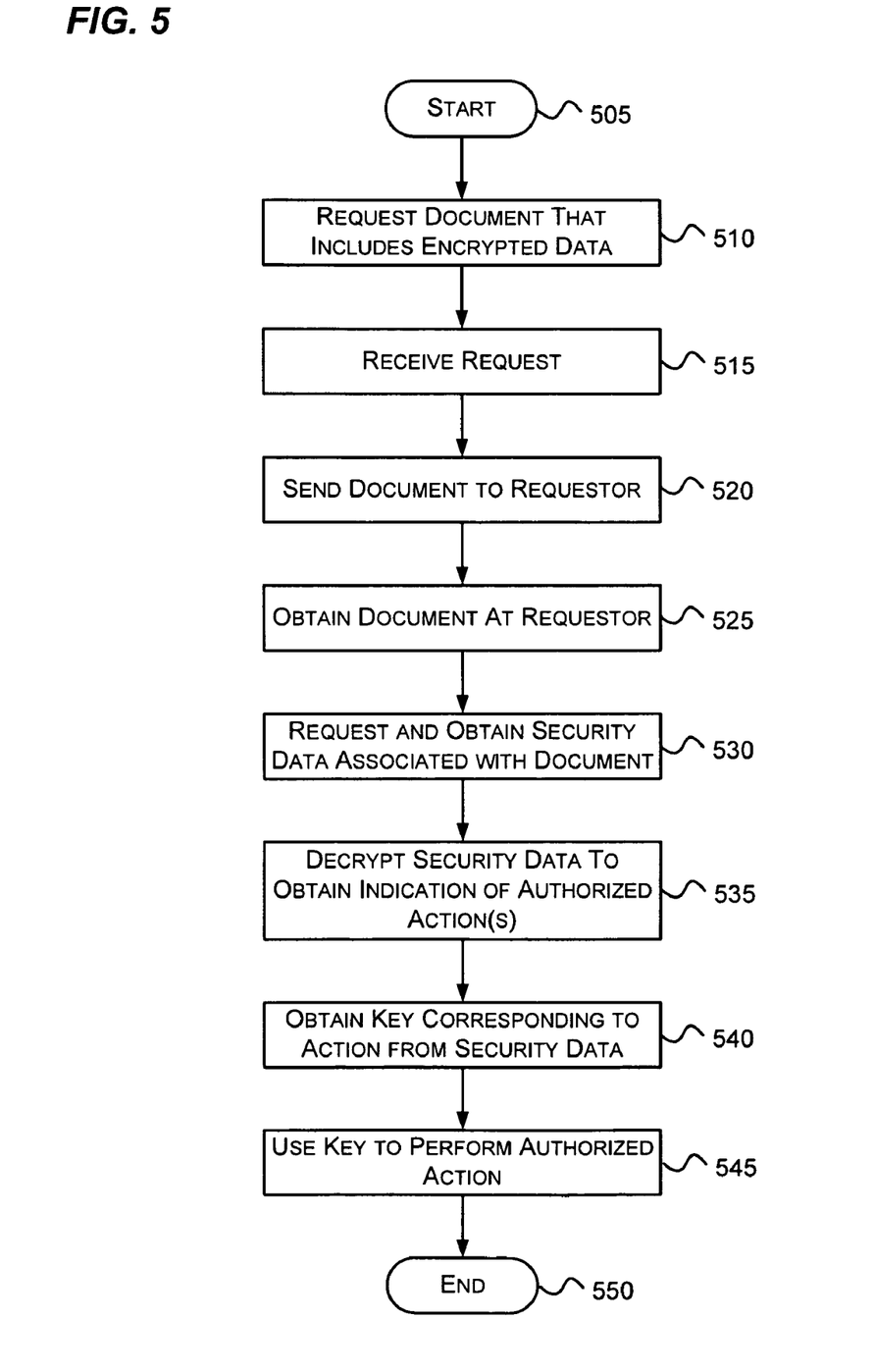
FIG. 5 is a flow diagram that generally represents exemplary actions that may occur in accessing a document in accordance with aspects of the subject matter described herein.

FIG. 5 is a flow diagram that generally represents exemplary actions that may occur in accessing a document in accordance with aspects of the subject matter described herein. At block 505, the actions begin.

At block 510, an entity requests a document that includes encrypted data. For example, referring to FIG. 3, the requesting entity 305 sends a request for a document that is stored on the storage device 320.

At block 515, an entity receives the request. For example, referring to FIG. 3, one of the intermediary entities 310 or the storage access entity 315 receive the request.

At block 520, the document is sent to the requester. For example, referring to FIG. 3, the document is retrieved from the storage device 320 and sent to the requesting entity 305.

At block 525, the requestor obtains the document. For example, referring to FIG. 3, the requesting entity 305 receives the document.

At block 530, an entity makes a request and obtains security data associated with the document. For example, referring to FIG. 3, the requesting entity 305 obtains a security identifier from the document and sends the security identifier together with a request to the security data repository 335. In embodiments where the security data is included in the document, the requesting entity 305 may obtain the security data from the document itself.

At block 535, at least a portion of the security data (e.g., an authorization) is decrypted to obtain an indication of authorized access action(s) pertaining to the document. For example, referring to FIGS. 3 and 4, the requesting entity 305 decrypts an authorization in the authorization field 435 and determines that the requesting entity 305 has read access to the document.

At block 540, a key corresponding to the action is obtained from the security data. In one embodiment, the key is obtained the decryption action of block 535; in another embodiment, the key is obtained from another portion of the security document. For example, referring to FIGS. 3 and 4, the requesting entity 305 obtains the key to read the document from the authorization field 435.

At block 545, the key is used to perform the action. For example, referring to FIGS. 3 and 4, the requesting entity 305 uses the key to decrypt the encrypted data in the encrypted data field 420.

At block 550, the actions end. In one embodiment, the actions occur in the order described in conjunction with FIG. 5. In other embodiments, the actions described above with respect to FIG. 5 may occur in another order and/or in parallel without departing from the spirit or scope of the subject matter described herein. Furthermore, it should be recognized that the actions may or may not occur very close together. For example, a file synchronization system may periodically request documents and store them locally. Later, when a user wishes to view a document, the user may seek to open the document and other actions may occur to obtain the security data and decrypt the document.

Figure 6:
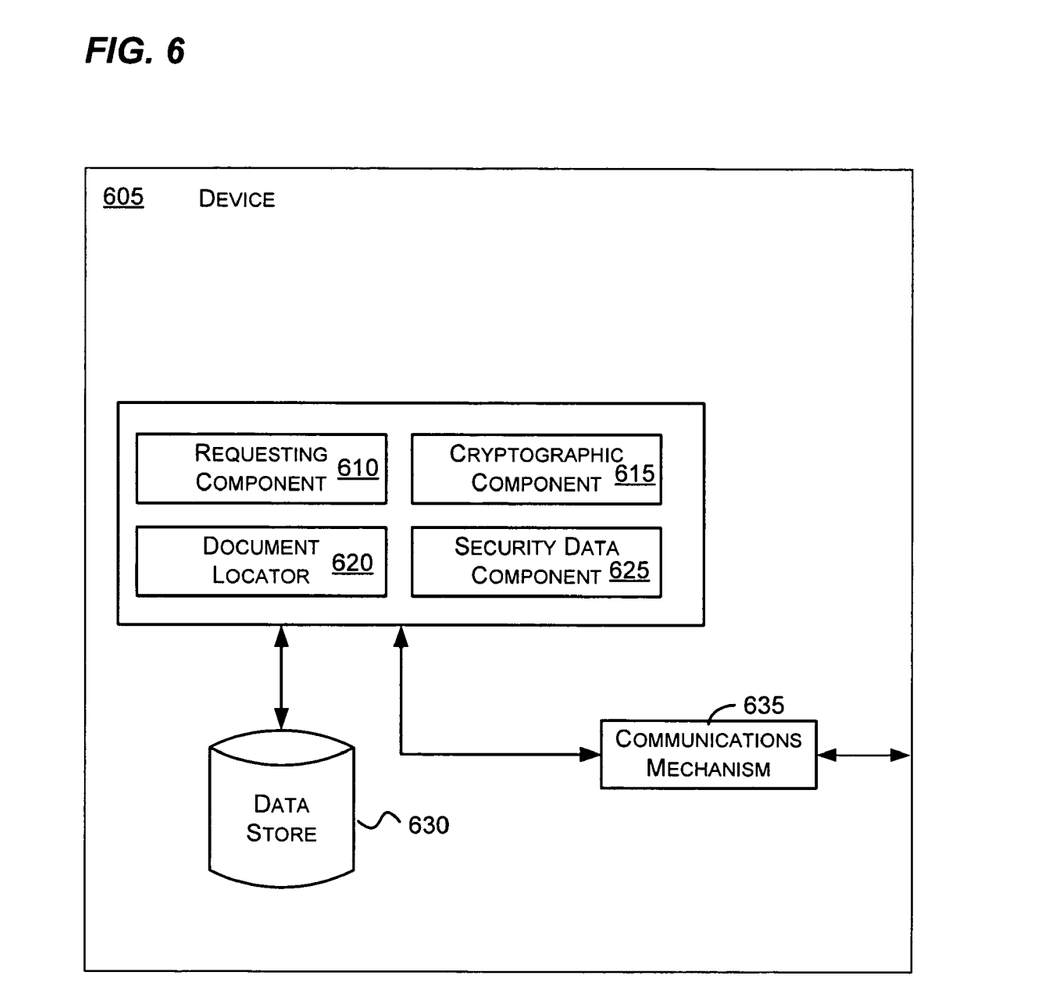
FIG. 6 is a block diagram that represents an exemplary device configured to operate in accordance with aspects of the subject matter described herein.

FIG. 6 is a block diagram that represents an exemplary device configured to operate in accordance with aspects of the subject matter described herein. The device 605 may include a requesting component 610, a cryptographic component 615, a document locator 620, a security data component 625, a data store 630, and a communications mechanism 635.

The requesting component 610 represents the requesting entity described previously. The cryptographic component 615 is used to encrypt and decrypt data and may comprise a library of cryptographic routines, for example.

The document locator 620 determines where the document is located which will either be on the local data store 630 or on some data store external to the device 605.

The security data component 625 interacts with the security data to obtain access rights pertaining to the document.

The communications mechanism 635 allows the device 605 to communicate with other devices to obtain documents and security data, for example. The communications mechanism 640 may be a network interface or adapter 170, modem 172, or any other means for establishing communications as described in conjunction with FIG. 1.

It will be recognized that other variations of the device 605 shown in FIG. 6 may be implemented without departing from the spirit or scope of aspects of the subject matter described herein. It will be recognized that more, fewer, or other components may exist on the device 605 without departing from the spirit or scope of aspects of the subject matter described herein.

As can be seen from the foregoing detailed description, aspects have been described related to cryptographically controlling access to documents. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer storage medium, not consisting of signals, having computer-executable instructions, which when executed perform actions, comprising:
   obtaining a first document that includes a first identifier that identifies a second document;
   obtaining a first key from security information associated with the first document;
   obtaining the second document, which includes encrypted data, at a first device from a data store that is located external to the first device using the first key, the second document including a second identifier that identifies security data associated with the second document, at least some of the security data being encrypted;
   decrypting at least a portion of the security data at the first device using the first key to obtain an indication of an action that is authorized with respect to the second document, the indication including a second key that corresponds to the action; and
   using the second key at the first device to perform the action, including using the second key for decryption of the encrypted data.

2. The computer storage medium of claim 1, wherein obtaining the second document further comprises receiving the second document from the data store through at least an intermediary device.

3. The computer storage medium of claim 1, further comprising sending a request for the security data and providing the second identifier with the request.

4. The computer storage medium of claim 1, wherein the action comprises changing what entities are allowed to access the second document.

5. The computer storage medium of claim 1, wherein the action comprises indicating that a document was modified at an indicated time.

6. The computer storage medium of claim 1, wherein the action comprises creating a new version of the second document.

7. The computer storage medium of claim 1, wherein the security data is included in the second document.

8. The computer storage medium of claim 1, wherein the security data is not included in the second document.

9. The computer storage medium of claim 1, wherein the second identifier is a hash of fields that are included in the security data.

10. The computer storage medium of claim 1, wherein the second key that corresponds to the action is an encrypted key;
   wherein the computer-executable instructions, when executed perform the actions, further comprising decrypting the encrypted key to provide a decrypted key; and wherein the computer-executable instructions for using the second key at the first device comprise computer-executable instructions for using the decrypted key to perform the action.

11. The computer storage medium of claim 1, wherein the computer-executable instructions for using the second key at the first device comprise computer-executable instructions for using the second key to decrypt at least one third key that is included in the security data and for using the at least one third key to perform the action.

12. The computer storage medium of claim 11, wherein the computer-executable instructions for using the second key at the first device comprise computer-executable instructions for decrypting the encrypted data using the at least one third key to perform the action.

13. A method implemented at least in part by a computer, the method comprising:
receiving a first request for a first document;
in response to the first request, sending the first document including a first identifier that identifies a second document;
receiving a second request for a second document that includes encrypted data based on the first identifier, the second document including a second identifier that identifies security data associated with the second document, at least some of the security data being encrypted, the at least some of the security data that is encrypted being configured for decryption using a first key from security information associated with the first document to obtain an indication of an action that is authorized with respect to accessing the second document, the indication including a second key configured to be used for the decryption of the encrypted data to perform the action; and
in response to the second request, sending the second document using a processing unit based on the first key.

14. The method of claim 13, wherein the second request was sent from a first device and wherein sending the second document comprises sending the second document to a second device in route to the first device.

15. The method of claim 13, further comprising, forwarding the second request to a device that stores the second document and receiving the second document from the device before sending the second document.

16. The method of claim 13, wherein the second request is received by a device that has access to a storage device upon which the second document is stored and further comprising retrieving the second document from the storage device.

17. The method of claim 13, wherein the action that is authorized with respect to accessing the second document comprises decrypting the encrypted data included in the second document.

18. In a computing environment, an apparatus, comprising:
one or more processors;
a requesting component, implemented using at least one of the one or more processors, configured to request a first document that includes a first identifier that identifies a second document, the requesting component further configured to request access to the second document, which includes a second identifier that identifies security data associated with the second document, at least some of the security data being encrypted, the at least some of the security data being configured for decryption using a first key from security information associated with the first document to obtain an indication of an action that is authorized with respect to the second document, the indication including a second key that corresponds to the action;
a document locator, implemented using at least one of the one or more processors, configured to determine a location of the second document; and
a cryptographic component, implemented using at least one of the one or more processors, configured to use the first key to obtain the second document from the location, the cryptographic component further configured to use the second key to decrypt an encrypted portion of the second document to perform the action on the second document.

19. The apparatus of claim 18, further comprising a security data component configured to obtain the security data.

20. The apparatus of claim 18, wherein the location of the second document comprises a data store external to a device upon which the requesting component operates.

21. A computer storage medium, not consisting of signals, having computer-executable instructions, which when executed perform actions, comprising:
obtaining a first version of a document that includes a first identifier that identifies a second version of the document;
obtaining a first key from security information associated with the first version of the document;
obtaining the second version of the document, which includes encrypted data, at a first device from a data store that is located external to the first device using the first key, the second version of the document including a second identifier that identifies security data associated with the second version of the document, at least some of the security data being encrypted;
decrypting at least a portion of the security data at the first device using the first key to obtain an indication of an action that is authorized with respect to the second version of the document, the indication including a second key that corresponds to the action; and
using the second key at the first device to perform the action, including using the second key for decryption of the encrypted data.

22. The computer storage medium of claim 21, wherein the computer-executable instructions for using the second key at the first device comprise computer-executable instructions for using the second key to decrypt at least one third key that is included in the security data and for using the at least one third key to perform the action.

23. The computer storage medium of claim 21, wherein the second identifier includes a hash of fields that are included in the security data;
wherein at least one of the fields includes one or more authorizations for one or more respective security principals that are to have access to the second version of the document;
wherein the computer-executable instructions, when executed perform the actions, further comprising:
using an authorization in the one or more authorizations to decrypt the second key; and
wherein the computer-executable instructions for using the second key at the first device comprise computer-executable instructions for using the second key at the first device in response to the authorization being used to decrypt the second key.

* * * * *